Feb. 4, 1964   H. BUCKLE   3,120,447
PROCESS FOR PRODUCING SUPERFICIAL PROTECTIVE LAYERS
Filed June 21, 1961

INVENTOR
HELMUT BUCKLE
BY Josef Oshroff
ATTORNEYS

United States Patent Office 3,120,447
Patented Feb. 4, 1964

3,120,447
PROCESS FOR PRODUCING SUPERFICIAL
PROTECTIVE LAYERS
Helmut Buckle, Paris, France, assignor to Office National
d'Etudes et de Recherches Aeronautiques, a corporation
of France
Filed June 21, 1961, Ser. No. 121,808
Claims priority, application France May 14, 1952
4 Claims. (Cl. 117—22)

This is a continuation-in-part of application Serial No. 630,971, filed Dec. 27, 1956, now abandoned, which in turn is a continuation-in-part of application Serial No. 354,843, filed May 13, 1953, now abandoned.

This invention relates to a method of providing ameliorating surface coatings of a metallic compound, over the surfaces of metal parts, and it is more especially directed to the provision of a zincic coating upon a copper or silver part.

The invention is further applicable to the production of such coatings on a part made of an alloy containing any of the above listed metals in major proportion.

It is an object of the invention to provide protective coatings that are extremely firmly bonded to the underlying metal surface and having high engineering characteristics.

According to the invention, there is formed by a process of undisturbed diffusion, upon the metallic part to be protected, a compound of the base metal of said part with zinc, or a so-called intermetallic compound, by contacting said surface with a donor constituent wherein the true concentration of zinc is higher than the zinc in said intermetallic compound at the upper limit or boundary of the domain of existence of said compound in the phase diagram of both metals and at a temperature at which the said compound exists.

The term "donor" is here used to designate the substance or mixture of substances contacting the surface to be treated and the active element in said donor will sometimes be called hereinafter "donor element" or "diffusing element." It is understood that such element is zinc.

The "true concentration" of the donor, as this expression is here used, signifies the content of the diffusing element in the donor, due correction being made for the porosity of the donor and the possible presence therein of extraneous substances having a diluting action and/or impurities.

Figure 1:
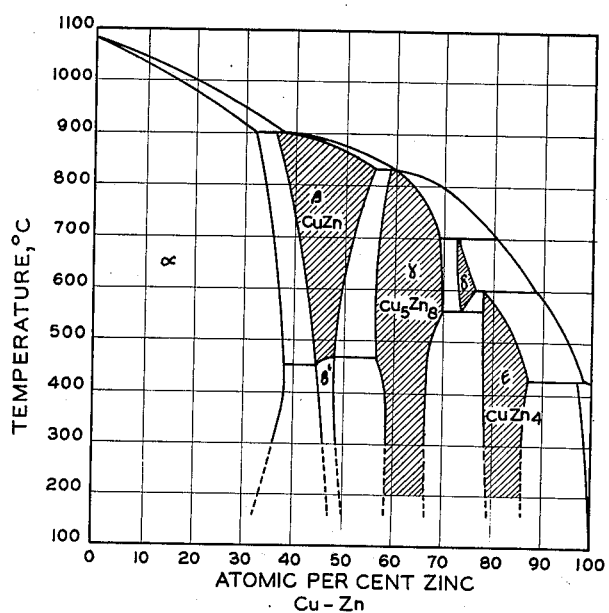
Figure 2:
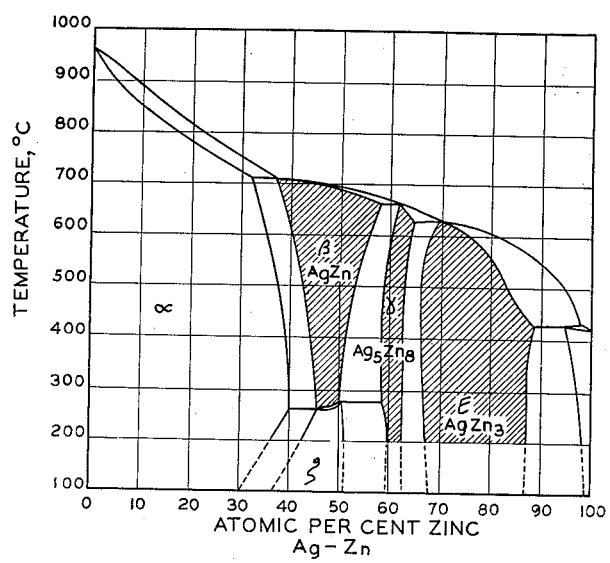

In the accompanying drawing the following phase diagrams are shown in semi-diagrammatic form:
FIG. 1 shows the Cu—Zn diagram; and
FIG. 2 shows the Ag—Zn diagram.

It should be recalled that in such phase diagrams the temperatures are plotted in ordinates and the concentrations of one or the other of the constituent metals in abscissae, with the vertical boundary lines in each diagram representing the 100% concentration of one metal and the 100% concentration of the other metal respectively.

In the shown diagrams, the hatched portions indicate the domains of existence of the intermetallic compounds, or crystalline "mono-phases," which according to the invention are formed upon the parts of the metal indicated by the left-hand vertical boundary line in the corresponding diagram. The said intermetallic compounds are also called "intermetallic phases" or simply "definite compounds." They are sometimes designated by Greek letters ($\alpha$, $\beta$, $\gamma$, $\epsilon$) or by chemical symbols which correspond to their crystalline structure and express the fact that their characteristics differ fundamentally from those of solid solution phases of the base metals or elements which form the constituents of the binary diagrams. It is to be noted that the chemical symbols, such as $A_mB_n$, as here used, despite their quantitative or stoichiometric appearance, are not to be interpreted as representing with precision the chemical composition of any "definite compound," and that the term "definite" as used in this last expression does not refer to any determined composition but rather to the precise definition of the boundaries of the domains of existence of the compounds under consideration. Such boundaries are unambiguously specified in terms of temperature and concentrations in the phase diagrams found in the literature, cf. for example the authoritative work by M. Hansen, "Constitution of Binary Alloys," McGraw Hill Book Co. Inc., New York.

In the accompanying drawings, the aforesaid domains of existence are represented by way of illustration, not limitation.

FORMATION OF A COPPER-ZINC COMPOUND SURFACE COATING ON A COPPER OR COPPER-BASE ALLOY PART

The object of the invention, in this instance, is to provide a firmly-bonded coating on a copper or copper alloy part, which compound will be harder than the copper or copper alloy forming the part.

Another object of the invention is to provide such a coating on a copper or copper alloy part, which will have high homogeneity and is adapted to take a very high degree of polish. It is, therefore, an object of the invention to provide copper-base parts having a very low coefficient of friction and susceptible of interesting applications especially in the fields of precision instruments, watchmaking and the like.

Another object of the invention is to provide such parts as latches, grips, handles, and the like, formed from copper or copper alloys, and having a surface hardness substantially higher than that of the base copper or alloy.

Another object is to provide parts of silver or silver alloys having a firmly adherent coating of a high degree of hardness.

The invention, in the present instance, comprises forming upon the surface of a copper part or a part made from a copper base alloy, a coating of an intermetallic copper-zinc compound present in the Cu—Zn phase diagram, by contacting with the copper part a donor containing zinc in a concentration higher than the upper limit of the domain of said desired intermetallic compound as found on the phase diagram, at a temperature at which said compound exists on the diagram, and the contact conditions being such as to provide for an undisturbed diffusion between the solids concerned.

It is known that the copper-zinc diagram (FIG. 1) shows the existence of three intermetallic phases, respectively known as phase $\beta$, phase $\gamma$ and phase $\epsilon$ shown hatched in FIG. 1, and respectively corresponding to the definite compounds $CuZn$, $Cu_5Zn_8$ and $CuZn_4$.

According to the invention, in order to form a coating phase $\gamma$ on a part made of copper or copper alloy, the part is placed in intimate and continuous contact with zinc powder at a temperature high enough to produce a layer of the desired thickness within an economically reasonable period, which temperature may be within the range of about 340–400° C. and preferably about 360–380° C. The resulting $\gamma$ phase layer is extremely firmly bonded, a result ascribable to its manner of formation, and it has a homogeneous structure throughout its depth, i.e. the structure of the $\gamma$ phase. The resulting coating therefore has all the properties of the $\gamma$ phase, such as a micro-hardness number in the range from 420 to 500 Vickers (as against 50 for copper), and good flexibility.

According to another form of embodiment, a similar procedure is followed, except that $\gamma$ powder is used as the donor and is heated in the range from 350 to 650° C. The resulting coating does not comprise the γ phase, but instead comprises the β phase; the coating action again is firmly adherent and of uniform structure throughout its depth. It has great flexibility and its surface characteristics are those displayed by the β phase, with a micro-hardness in the range from 200 to 250 Vickers.

As a modification of this second embodiment, the invention contemplates starting with a part made of copper or copper alloy preliminarily coated with a γ phase layer, e.g. obtained by applying the first embodiment of the invention above described, and heating the coated part within the temperature range indicated in the second embodiment above.

According to an important feature of the invention, the treatment is effected under conditions such as to maintain a high degree of purity of the substances involved, i.e. copper or copper alloy, and donor powder, throughout their areas of contact. For this purpose, inter alia, the treatment may be performed in a protective atmosphere such as purified hydrogen, or alternatively ammonium chloride or ammonium fluoride may be added to the powder, thereby preventing any oxidation of the donor powder metal. With this latter operating procedure the operation can be carried out in the presence of air, thereby simplifying the requisite apparatus.

Example 1

A part made of copper or copper alloy is thoroughly cleaned and heated to 380° C. in a thick bed of well compacted zinc powder, in which about 2% ammonium chloride (cleaning agent) was uniformly distributed by thorough mixing, and in an atmosphere of purified hydrogen. There forms a surface layer of the γ phase ($Cu_3Zn_8$), which is 0.12 mm. deep after one hour treatment, in the case of a pure copper part. Where a copper alloy part is used, the depth of the γ layer is less; thus for a brass part it is about two thirds the depth of the layer obtained with a pure copper part in the same period of time. In all cases the depth is a function of the square root of the time of treatment. A coating about 0.07 to 0.08 mm. deep, obtainable in 20 to 30 minutes, is sufficient for most practical purposes.

Example 2

The same procedure as in Example 1 is used except that 5% ammonium fluoride replace the ammonium chloride, being similarly thoroughly mixed with the powder zinc. The treatment can now be carried out in the presence of air. Desirably the powder having the part imbedded in it is placed in a container having a simple lid thereon, no air-tight seal being required.

Generally speaking the proportion of ammonium fluoride powder used should be increased when the treatment time is increased and reduced when the treatment time is shortened.

Example 3

The copper or copper alloy part is heated one hour under the same conditions as in Example 1. The part is then removed from its powder bed and heated in a sealed enclosure in a partial vacuum for five hours at 500° C., without adding further zinc. The γ layer is then converted into a layer consisting entirely of the β phase (CuZn). The γ phase has become a donor and is consumed.

In the case of other thicknesses and/or temperatures, the duration of the further treatment is determined by the instant at which the β phase first appears on the surface in place of the γ phase. This is readily ascertained since the γ phase is grey, with a micro-hardness in the range from 420 to 500, while the β phase is yellow and has a micro-hardness range from 200 to 250.

Example 4

A copper or copper alloy part after thorough cleaning is heated in a thick bed of γ ($Cu_5Zn_8$) powder, well compacted, in which about 2% ammonium chloride was uniformly distributed, in an atmosphere of purified hydrogen. After one hour a surface layer of β (CuZn) was formed, about 0.05 mm. thick.

Example 5

The same procedure as in Example 4 is followed, but with about 5% ammonium fluoride replacing the ammonium chloride. The treatment can be carried out in the presence of air, desirably by placing the powder in which the part is immersed into a closed, but not necessarily sealed, container.

Example 6

A similar result as in Example 4 is obtained by using the same operating conditions as in that example except that the donor powder comprises a mixture of powder zinc and powder copper wherein the analytic content of zinc is in the range from 70 to 80%.

Example 7

A thoroughly cleaned part of copper or copper alloy has a uniform-thickness zinc coating applied thereto by any known technique, such as electrolytically, and is then heated at 380° C. in a sealed enclosure in a partial vacuum. After 30 minutes' treatment a zinc layer 0.06 mm. thick deep has been converted to a surface layer, about 0.1 mm. deep, comprising γ phase ($Cu_5Zn_8$).

[For other desired depths of the zinc coating, the treatment time would be determined by the outcropping of the γ phase, which then occupies the full available depth.]

Example 8

The procedure is the same as in Example 7, except that the zinc coated part is embedded in γ powder having ammonium chloride or ammonium fluoride added thereto, e.g. in an amount of from 1 to 5%, said amount being increased in proportion as the desired time of treatment is longer. This makes it possible to operate in the presence of air, e.g. in a lidded, but not sealed, container.

Example 9

The initial prescriptions of Example 7 or Example 8 are followed, but the heat treatment is continued until an outcropping of the β phase (CuZn) is noted at the surface. The layer is now entirely comprised of the β phase.

Similarly, protective coatings can be formed over silver or silver alloys containing major proportions of silver, which coatings will comprise definite compounds selected from among the three intermetallic phases existing on the Ag—Zn phase diagram (FIG. 2).

Example 10

For the protection of silver parts, the general procedure is the same as that in Example 1 or 2 relating to copper parts. There forms over the silver a surface layer comprising the $Ag_5Zn_8$ phase of a depth of about 0.025 mm. after one hour treatment, and with an unobjectionable sublayer of the phase AgZn. The micro-hardness of the $Ag_5Zn_8$ layer is about 450 Vickers, and that of the AgZn underlayer is about 250 Vickers. It may be here recalled that the surface micro-hardness of untreated silver is not higher than from 70 to 80 Vickers in the work-hardened state and 40 Vickers in the annealed condition, the micro-hardness figures for copper being about the same as for silver.

Example 11

A thorouhgly cleaned silver part is heated at 380° C. in a deep, well-ompacted bed of powder comprising the $Ag_5Zn_8$ phase containing about 2% ammonium chloride therein, in a purified hydrogen atmosphere. After one hour treatment, a surface layer has formed comprising the intermetal phase AgZn, about 0.08 mm. deep.

*Example 12*

The same result as in Example 11 is obtained when the $Ag_5Zn_8$ phase is replaced with a mixture of powder zinc and powder silver, or an inert powder having an analytic zinc content in the range 70–80% Zn.

I claim:

1. A method for improving a surface quality of a part made from copper by forming upon said part a layer of the β intermetallic compound to be found in the Cu—Zn state diagram, comprising the steps of closely and in all points contacting said part with zinc powder and heating at a temperature comprised between 340° C. and 400° C. in an atmosphere of purified hydrogen to form on said part the γ compound, then removing the zinc powder from the surface of said part, heating the part thus coated with the γ intermetallic compound at a temperature comprised between 350° C. and 650° C. in an atmosphere of purified hydrogen until the γ coating disappears to cause the part to be coated with a layer of the β intermetallic compound firmly bonded to the copper.

2. A method for ameliorating a quality of a surface of a part made of a metal of the group consisting of silver and an alloy in which silver is in a major proportion by forming upon said surface a layer of the AgZn phase as present in the Ag—Zn state diagram, comprising the steps of cleaning said surface, contacting said cleaned part closely and at every point with a layer of $Ag_5Zn_8$ phase powder, and heating at approximately 380° C. in an atmosphere of purified hydrogen.

3. A method for ameliorating a quality of a surface of a part made of a metal of the group consisting of silver and an alloy in which silver is in a major proportion by forming a coating of the AgZn intermetallic phase as found in the Ag—Zn state diagram, comprising the steps of cleaning said surface, applying on said surface a layer of a mixture of zinc powder and silver powder, the analytic percentage of zinc of which is comprised 70 and 80%, and heating the part thus prepared at a temperature between 340° C. and 400° C. in a protective atmosphere.

4. A method for improving a quality of a surface of a part made of a metal of the group consisting of silver and an alloy in which the silver is in a major proportion, by forming upon said surface a coating of the AgZn intermetallic phase as found in the Ag—Zn state diagram, comprising the steps of cleaning said surface, dipping in a mixture of zinc powder, silver powder and inert powder, the analytic percentage of zinc of which is comprised between 70% and 80%, and heating at a temperature comprised between 340° C. and 400° C. in a protective atmosphere until the desired thickness of the AgZn coating is obtained.

References Cited in the file of this patent

UNITED STATES PATENTS

| | | |
|---|---|---|
| 1,853,370 | Marshall | Apr. 12, 1932 |
| 2,490,700 | Nachtman | Dec. 6, 1949 |
| 2,686,355 | Lundin | Aug. 17, 1954 |
| 2,711,980 | De Santis et al. | June 28, 1955 |
| 2,816,048 | Galmiche | Dec. 10, 1957 |
| 2,874,070 | Galmiche | Feb. 17, 1959 |
| 2,924,004 | Wehrmann et al. | Feb. 9, 1960 |
| 3,044,156 | Whitfield | July 17, 1962 |
| 3,045,334 | Berzins | July 24, 1962 |
| 3,055,088 | Cox | Sept. 25, 1962 |

OTHER REFERENCES

"Constitution of Binary Alloys" (Hansen), published by McGraw-Hill Book Co., 1958 (pp. 62, 81, 114, 118, 147, 560, 649, 973, 1203 relied upon).

"Protective Coatings for Metals" (Burns et. al.), published by Reinhold Publishing Corp. (1939) (pp. 42, 211 and 213–217 relied upon).

UNITED STATES PATENT OFFICE
CERTIFICATE OF CORRECTION

Patent No. 3,120,447                            February 4, 1964

Helmut Buckle

It is hereby certified that error appears in the above numbered patent requiring correction and that the said Letters Patent should read as corrected below.

In the grant, lines 1 to 3, for "assignor to Office National d'Etudes et de Recherches Aeronautiques, a corporation of France," read -- assignor to Office National d'Etudes et de Recherches Aerospatiales, --; lines 12 and 13, for "Office National d'Etudes et de Recherches Aeronautiques, its successors" read -- Office National d'Etudes et de Recherches Aerospatiales, its successors --; in the heading to the printed specification, lines 4 to 6, for "assignor to Office National d'Etudes et de Recherches Aeronautiques, a corporation of France" read -- assignor to Office National d'Etudes et de Recherches Aerospatiales --.

Signed and sealed this 16th day of June 1964.

(SEAL)
Attest:

ERNEST W. SWIDER                          EDWARD J. BRENNER

Attesting Officer                         Commissioner of Patents